June 21, 1932.  A. H. D. MONCRIEFF ET AL  1,863,575
ROAD AND RAIL TRANSPORT
Filed Jan. 22, 1930   2 Sheets-Sheet 1

INVENTORS
ALISTAIR HOPE DALGAIRN MONCRIEFF,
JOHN SHEARMAN,
ATTORNEYS

June 21, 1932. A. H. D. MONCRIEFF ET AL 1,863,575
ROAD AND RAIL TRANSPORT
Filed Jan. 22, 1930 2 Sheets-Sheet 2

INVENTORS
ALISTAIR HOPE DALGAIRN MONCRIEFF,
JOHN SHEARMAN,
BY Toulmin & Toulmin
ATTORNEYS Patented June 21, 1932

1,863,575

UNITED STATES PATENT OFFICE

ALISTAIR HOPE DALGAIRN MONCRIEFF, OF WESTMINSTER, LONDON, AND JOHN SHEARMAN, OF HAMPSTEAD, LONDON, ENGLAND, ASSIGNORS TO KARRIER MOTORS LIMITED, OF HUDDERSFIELD, ENGLAND

ROAD AND RAIL TRANSPORT

Application filed January 22, 1930, Serial No. 422,528, and in Great Britain January 29, 1929.

The invention relates to means whereby vehicles, for example, trailers or self-propelled vehicles, may be adapted for use either on rails or on the ground, or on roads or the like.

The object of this invention is to provide an improved vehicle of the kind referred to.

In accordance with this invention, we provide a vehicle for road and rail transport having principal wheels adapted for running upon rails and with road wheels permanently mounted upon outer hubs formed on the principal wheels, means being provided whereby the road wheels may be moved into eccentricity relative to the rail wheels when travelling upon the rails.

The accompanying drawings illustrate one form of device made in accordance with this invention.

Figure 1:
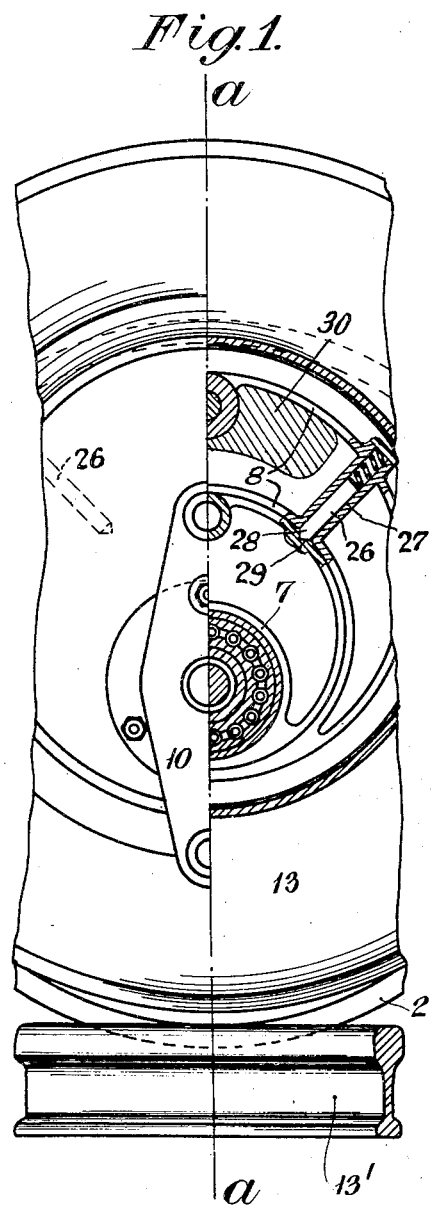
Fig. 1 illustrates one form of device in front elevation showing the road and rail wheels eccentric, partly in section.
Figure 2:
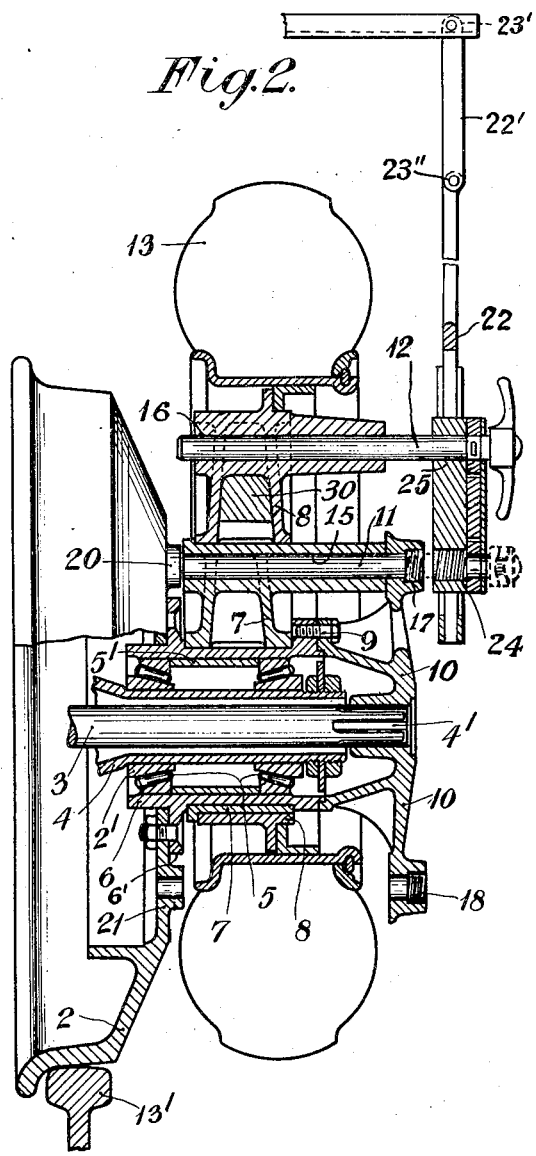
Fig. 2 is a cross section along the line $a-a$, in Fig. 1.
Figure 3:
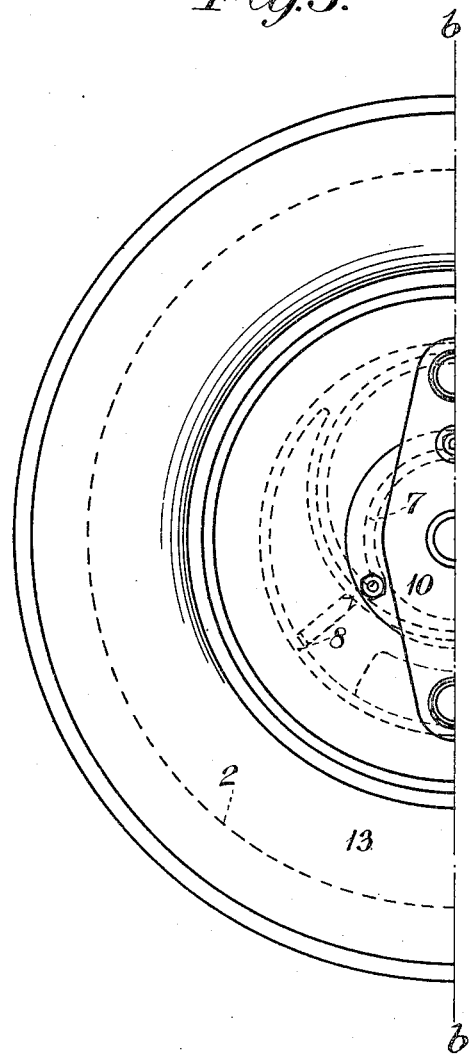
Fig. 3 illustrates in front elevation the same device as Fig. 1, the road and rail wheels being concentric, partly in section.
Figure 4:
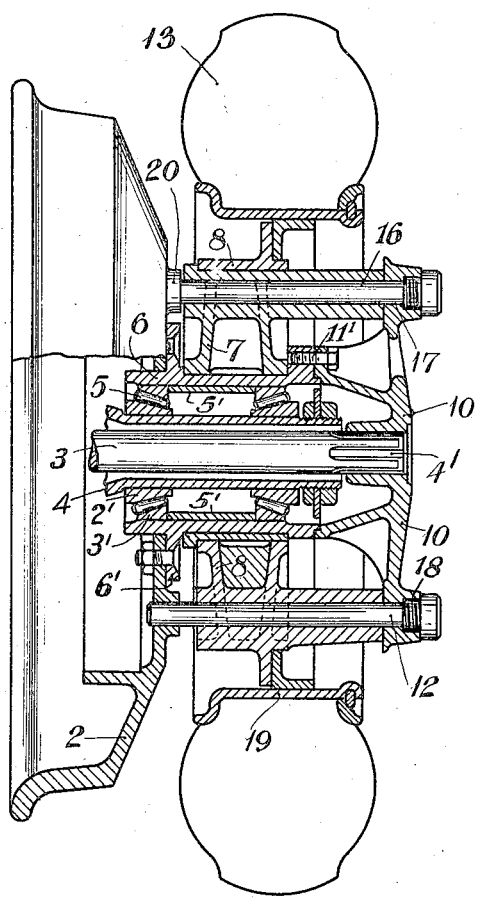
Fig. 4 is a cross section along the line $b-b$, in Fig. 3.

According to the form of this invention illustrated the vehicle is constructed having flanged wheels 2 of the type used on railways but fitted to the vehicle with provision for drive, braking and steering just as if they were normal road wheels, the wheel-track being suitable for railway use.

A live driven axle 3, splined at 4', is contained within a torque tube 4 which itself forms the chassis support and the axle on which the railway wheel 2 revolves upon roller bearings 5. These bearings 5 are disposed between rings 2', 3', separated by ring 5' and secured to torque sleeve 4 and to a bearing housing 6 secured to wheel 2 and which forms a hub or axle on which the inner eccentric or sleeve 7 revolves, the outer member or sleeve 6' of the cage being secured to rail wheel 2.

A ground or road wheel 8 is itself bored eccentrically to be a sliding fit on the outer portion of the inner eccentric or sleeve 7 and is disposed thereon. The bearings 5 are so disposed that they will be properly stressed both with the vehicle weight on the rail wheels 2, that is to say the narrow gauge, and also when the weight is on the road wheels 8, that is to say the broad gauge. Driving dog 10 is splined or secured to live or driving axle 3, and is also secured by bolts 9 to lugs 11' on housing 6, so that through this connection the drive is transmitted from axle 3 to wheel 2. For driving wheel 8, in a manner hereinafter described, the driving dog 10 is fixed to the pair of eccentrics; when not in use the road wheel 8 is fixed to a horn block as will be hereinafter described. Provision is made for bolts or push pins 11, 12, to attach the eccentric 7 to the main wheel 2, so that when these are withdrawn the eccentric 7 will revolve freely on bearing housing or axle 6. The road wheel 8 is of normal type as regards tires 13. The eccentricity of the two parts 7, 8, is such that in opposition the road wheel will be concentric with the railway wheel; but when the eccentricity is combined by movement either of the eccentric 8 or the eccentric 7 or both, the eccentric wheel 8 will move out of centre to the extent necessary to provide clearance to bring the tire 13 of the road wheel above the level of the tops of the rails 13'. The diameter of the tire is such that in the concentric position it will keep the flange 2' of the railway wheel suitably above the level of the ground or road 14 on which it may be travelling. This road wheel 8 may also be rigidly attachable to the main wheel 2 by a driving bolt or bolts or push pins 11, 12, through holes 15, 16, in eccentrics 7, 8.

In line with the bolt holes 15, 16, a socket or sockets or holes 17, 18, are provided in the driving dog 10, so that these parts may be locked to the eccentrics 7, 8, by the insertion of the bolts or pins 11, 12. 19 is the tire rim for tire 13.

In the rail wheel 2, sockets or holes 20, 21, are provided to receive pins 11, 12, when it is desired to connect rail and road wheels to transmit the drive from rail to road wheels.

The wheel or outer eccentric 8 is held in the upper position by attaching it to horn block strap 22 attached at 23" to an anchor plate 22' which is hinged at 23' to allow it to swing outwards should it be necessary to fit a spare wheel or in case after running on the road, the wheel should stop in such a position that the driving pin 11 in the inner eccentric 7 is opposite the horn block strap 22. There are two holes 24, 25, in the horn block for pins 11, 12, to support eccentrics 7, 8.

To locate the inner and outer eccentrics, a plunger 26 is provided which passes through a hole 27 in outer eccentric and has a conical or pointed end 28 which engages with one of two sockets 29 in the inner eccentric. The plunger may be operated by spring pressure automatically, or it may be operated manually by means of an external handle or knob fitted to the plunger.

In forming the eccentric wheel and sleeve the castings are so designed as at 30 that when the vehicle is running on the road and the eccentrics in opposition, the weight of the wheels is evenly balanced.

In operation assuming both wheels concentric that is for normal road conditions, in order to raise the road wheel, both driving pins 11, 12, are removed when the road wheel can be freely rotated on the hub, the inner and outer eccentrics 7, 8, being located by the plunger 26. The road wheel is rotated until the driving pin hole 15 in the inner eccentric is opposite lower hole 24, and then the driving pin 11 is inserted through the lower hole 24 in the horn block, into the hole 15 in the inner eccentric. The road wheel with the outer eccentric 8 is rotated until its driving pin hole 16 is opposite to the upper hole 25 in the horn block. The other driving pin 12 is then inserted through the hole 25 in the horn block and the outer eccentric 8, thus locating the latter. The outer eccentric 8 is also located by means of the plunger 26 which is not opposite the groove or socket 29 in the inner eccentric. After the raising operation is completed the part 11 is removed in order to allow the rotation of the rail wheel 2 without destructive effect.

The driving pins 11, 12, may be provided with a groove at their outer extremity into which a locking plate fits in order to make them register definitely in this position either in driving dogs 10 or in the horn block 22.

In a modified form of the invention where the road wheels have considerable weight additional interlocking may be provided by means of spring bolts projecting from the eccentric into the wheel or vice versa arranged so as to be free to ratchet in one direction providing thus a means of revolving the wheel about the eccentric gradually.

When the vehicle is run on to the railway from the road, and the track over which it runs has points and crossings which have not been arranged specially so as to raise the wheels which may be done where they are few, all that is necessary to do where there are two bolt fastenings is to remove these, interlock wheel and eccentric with one bolt fastening, swing the eccentrics into the top position and use the second bolt in a retaining strap to hold the wheel in this position where they are free to hang leaving the hubs of the main wheels running freely through the centres of the eccentrics as the vehicle proceeds along the rail to its destination. The reversal of this process leaves it free once more to take the road.

The rail wheels in vehicles constructed according to this invention are of the usual form for use on the railways over which it is desired to run and of any suitable diameter, the road wheels may have any form of tire, pneumatic or solid, desired, and are of a suitable size and diameter to the service required.

The inventors do not restrict themselves to the smaller mechanical details described, the object of the invention being to provide a dual purpose vehicle adaptable with safety and despatch for either purpose without major alterations or change of parts or special mechanism.

It will thus be seen that we provide means for keeping the bearings outside the centre of the inner wheels.

We also provide means for using the housing as a hub. Furthermore we make the road wheel itself an eccentric so as to secure sufficient lift.

Thus in a self propelled vehicle we provide an eccentric, which may be a double eccentric, means on a live axle whereby the relative positions of the road and rail wheels can be altered. Furthermore we provide in connection with pairs of rail and road or ground wheels double eccentric means, whereby the relative position of the wheels is altered.

The invention is applicable to vehicles which are self propelled and which are not self propelled and may be applied to the steering part of the vehicle.

What we claim and desire to secure by Letters Patent is:—

1. Vehicles which are provided with principal wheels adapted for running upon rails and with road wheels permanently mounted upon outer hubs formed on the principal wheels, means being provided whereby the road wheels may be moved into eccentricity relative to the rail wheels when travelling upon the rails.

2. Vehicles for road and rail transport having principal wheels flanged for rail use upon the outer side of which are formed hubs, and auxiliary wheels arranged for road use formed as eccentrics co-acting with the eccentric peripheries of sleeves on these hubs.

3. In vehicles for road and rail transport, having principal wheels flanged for rail use upon the outer side of which are formed hubs, and auxiliary wheels arranged for road use formed as eccentrics co-acting with the eccentric peripheries of sleeves on these hubs, for altering the relative positions of road and rail wheels, and means for balancing the eccentrics whereby the road travel is made even.

4. In vehicles for road and rail transport having principal wheels flanged for rail use upon the outer side of which are formed hubs, and auxiliary wheels arranged for road use formed as eccentrics co-acting with the eccentric peripheries of sleeves on these hubs, said auxiliary wheels which are interchangeable and detachable for purposes of tire repair.

5. In vehicles for road and rail transport having principal wheels flanged for rail use upon the outer side of which are formed hubs, and auxiliary wheels arranged for road use formed as eccentrics co-acting with the eccentric peripheries of sleeves on these hubs, road wheels which are interchangeable and detachable for purposes of tire repair, and horn blocks for holding the road wheels when not in use.

6. Vehicles for road and rail transport having principal wheels flanged for rail use upon the outer side of which are formed hubs, and auxiliary wheels arranged for road use formed as eccentrics co-acting with the eccentric peripheries of sleeves on these hubs, and having driving dogs on the axles and extended to the rail wheels and being provided with means to receive pins which pass through holes in the road wheels and engage with the rail wheels so as to convey the drive from the rail wheels to the road wheels, and means whereby pins hold the road wheels in this raised position secured to members fixed to the body of the vehicle.

7. Vehicles having rail wheels fitted as principal wheels and having outside them wheels suitable for use on the road, said road wheels being disposed on hubs secured to the rail wheels, said hubs being coaxial with the rail wheels, and running on antifriction bearings, said hubs forming housings for said bearings, the bearings being placed outside the journal centres of the second set of wheels and within the journal centres of the first set.

8. Vehicles having rail wheels fitted as principal wheels and having outside them wheels suitable for use on the road, said road wheels being disposed on hubs secured to the rail wheels, said hubs being coaxial with the rail wheels, and running on antifriction bearings, said hubs forming housings for said bearings, the bearings being placed outside the journal centres of the second set of wheels and within the journal centres of the first set, the road wheels being interchangeable and detachable for the purpose of repair.

In testimony whereof, we affix our signatures.

ALISTAIR HOPE DALGAIRN MONCRIEFF.
JOHN SHEARMAN.